United States Patent [19]
Keen

[11] Patent Number: 5,526,422
[45] Date of Patent: Jun. 11, 1996

[54] SYSTEM AND METHOD FOR CLEANING THE DISPLAY SCREEN OF A TOUCH SCREEN DEVICE

[75] Inventor: Donald M. Keen, Indianapolis, Ind.

[73] Assignee: AT&T Corp., Murray Hill, N.J.

[21] Appl. No.: 262,809

[22] Filed: Jun. 20, 1994

[51] Int. Cl.[6] .............................. G09G 3/02; H04M 3/42
[52] U.S. Cl. ............................ 379/396; 379/88; 379/96; 345/173
[58] Field of Search ............................... 379/396, 96, 88, 379/201, 94; 345/173

[56] References Cited

U.S. PATENT DOCUMENTS 4,992,779  2/1991  Sugino et al. ........................... 345/173
5,402,477  3/1995  McMahan et al. ...................... 379/201

Primary Examiner—Jeffery Hofsass
Assistant Examiner—Jacques M. Saint-Surin

[57] ABSTRACT

A procedure for cleaning a display screen in a touch screen based telephone such that features of the telephone are not inadvertently activated is described. The procedure operates by causing the telephone (actually, a processor in the telephone) to enter a "clean screen" mode in response to a request from the user to clean the display screen. While in the "clean screen" mode, all signals generated in response to the user touching the display screen are ignored. In this matter, while in the "clean screen" mode, the user is able to clean the display screen without inadvertently activating any features of the telephone. The telephone automatically determines when the user has finished cleaning the display screen. When it is determined that the user has finished cleaning the display screen, the telephone leaves the "clean screen" mode and enters an "active screen". While in the "active screen" mode, all signals generated in response to the user touching the display screen are processed.

11 Claims, 3 Drawing Sheets

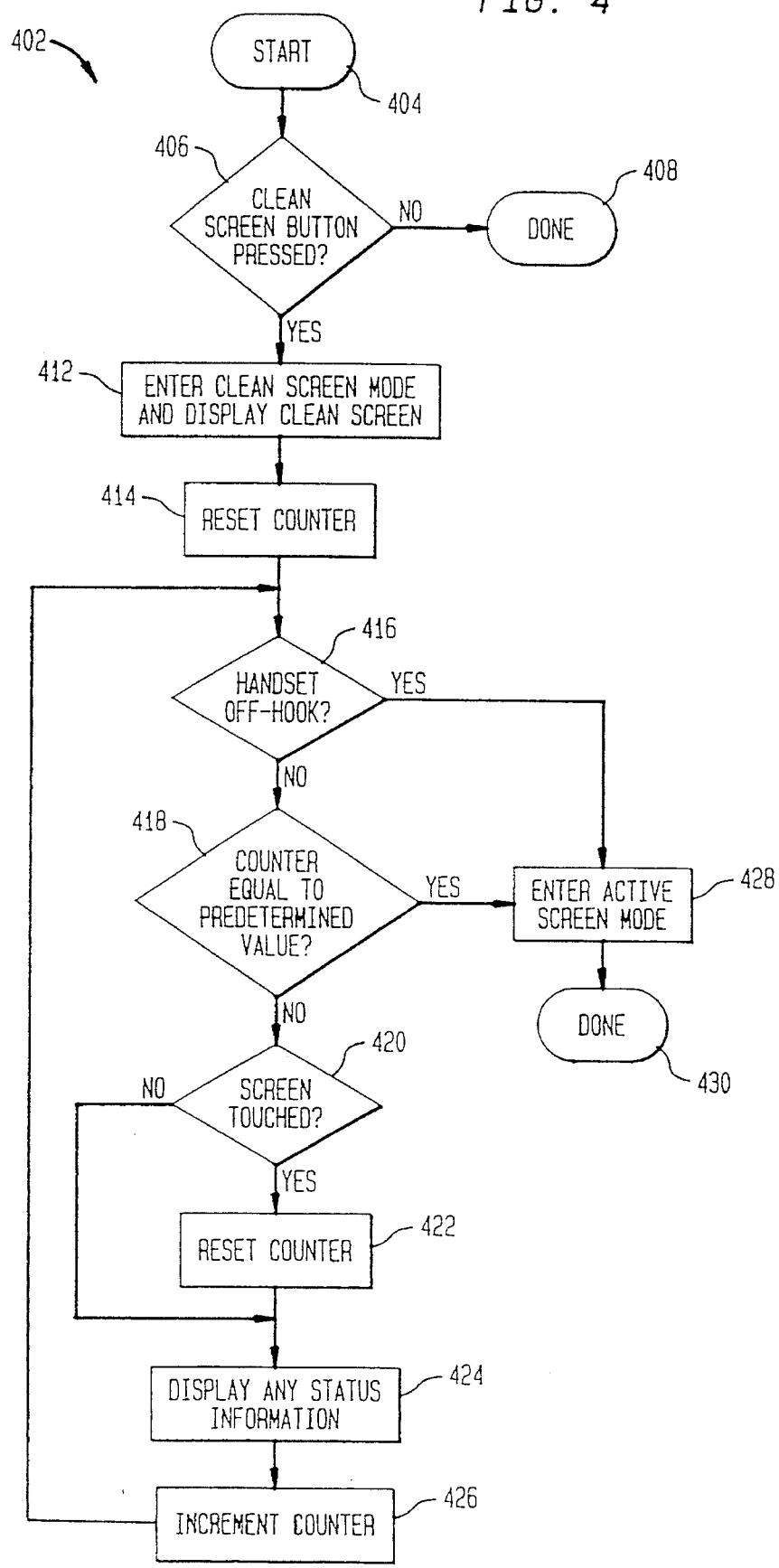

SYSTEM AND METHOD FOR CLEANING THE DISPLAY SCREEN OF A TOUCH SCREEN DEVICE

BACKGROUND OF THE INVENTION

1. Field of the Invention

The present invention relates generally to touch screen devices, and more particularly to a system and method for cleaning the display screen of a touch screen device.

2. Related Art

In a touch screen device, user input is received via the device's display screen. Typically, a menu of options is displayed on the device's display screen. Each option corresponds to a feature provided by the device. A user selects one of the options by touching the appropriate part of the display screen.

Touching a touch screen device's display screen will result in the accumulation of oil and/or dirt on the display screen. Thus, to ensure proper operation, the display screen must be periodically cleaned. Such cleaning necessarily involves touching the display screen.

Conventional touch screen devices cannot differentiate between "screen touches" made to enter user input and screen touches made to clean the display screen. Consequently, the cleaning of a touch screen device's display screen may result in the inadvertent activation of the device's features, thereby resulting in improper operation of the device, and perhaps even damage to the device.

A conventional solution to this problem requires the removal of power to the device (i.e., turning the device off) while the device's display screen is cleaned, or at least removal of power from the device's display screen. However, this solution is inadequate for many types of touch screen devices, particularly devices which use their display screens to provide status information to users. In such devices, removal of power frown the display screen is not advantageous since it would then be impossible to provide status information to users. Also, this solution is inadequate since it requires that users remember to turn the device back on.

Thus, what is required is a system and method for enabling a user to clean a touch screen device's display screen without inadvertently activating the device's features, and without removing power from the device or from the display screen.

SUMMARY OF THE INVENTION

The present invention is directed to a touch screen based telephone having the capability of enabling a user to clean the telephone's display screen without inadvertently activating any features of the telephone. The telephone (actually, a processor in the telephone) operates by entering a "clean screen" mode in response to a request from the user to clean the display screen. While in the "clean screen" mode, all signals generated in response to the user touching the display screen are ignored. In this matter, while in the "clean screen" mode, the user is able to clean the display screen without inadvertently activating any features of the telephone.

The telephone operates to determine when the user has finished cleaning the display screen. When it is determined that the user has finished cleaning the display screen, the telephone leaves the "clean screen" mode and enters an "active screen". While in the "active screen" mode, all signals generated in response to the user touching the display screen are processed.

The telephone operates to determine when the user has finished cleaning the display screen by determining whether the user failed to touch the display screen for a predetermined amount of time, and by detecting whether the telephone's handset has transitioned from on-hook to off-hook. The telephone determines that the user has finished cleaning the display screen if it is determined that the user failed to touch the display screen for the predetermined amount of time, or the handset has transitioned from on-hook to off-hook.

Further features and advantages of the present invention, as well as the structure and operation of various embodiments of the present invention, are described in detail below with reference to the accompanying drawings. In the drawings, like reference numbers indicate identical or functionally similar elements.

BRIEF DESCRIPTION OF THE FIGURES

The present invention will be described with reference to the accompanying drawings, wherein:

FIG. 4 is a flowchart depicting the preferred operation of the present invention.

DETAILED DESCRIPTION OF THE PREFERRED EMBODIMENTS

The present invention is directed to a system and method for enabling a user to clean a touch screen device's display screen without inadvertently activating any of the device's features (other than the "clean screen" feature), and without removing power from the device or from the display screen. For convenience purposes, the present invention is described herein in terms of a touch screen based telephony product, such as a telephone. However, it should be understood that the present invention includes all types of touch screen products. In particular, the present invention includes touch screen devices which use their display screens to provide status information to users, such that removal of power from the display screen is not advantageous since such power removal makes it impossible to provide status information to users.

Figure 1:
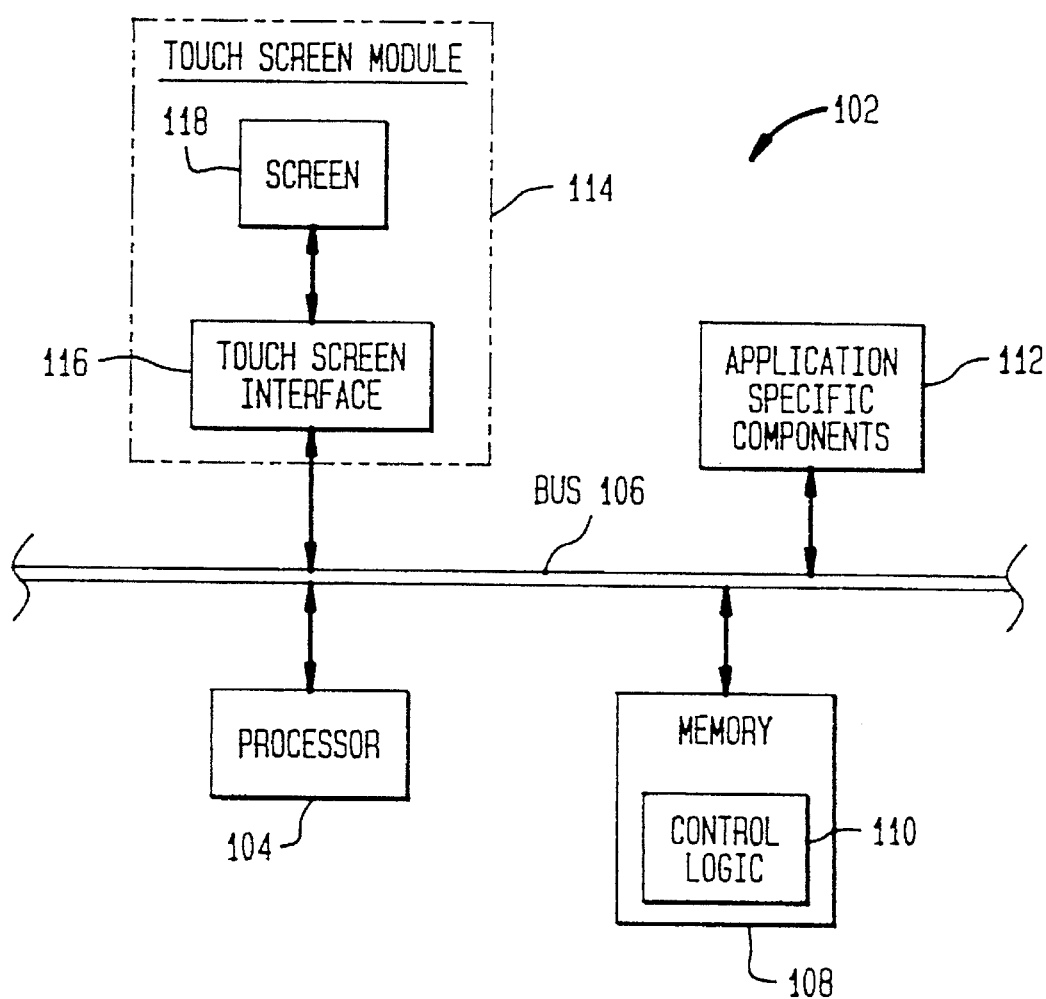
FIG. 1 is a block diagram of a touch screen based device according to a preferred embodiment of the present invention.

FIG. 1 is a block diagram of a touch screen based telephone 102 according to a preferred embodiment of the present invention. The telephone 102 includes a processor 104, such as a central processing unit (CPU), that is connected to a communication medium, such as a bus 106. The bus 106 connects elements of the telephone 102 (such as the processor 104) to other elements of the telephone 102 (such as application specific components 112, described below). However, these elements may be connected to one another using other means. For example, elements of the telephone 102 may be connected to each other using a plurality of dedicated lines, or a combination of the bus 106 and dedicated lines.

The processor 104 operates in accordance with control logic 110 stored in a memory device 108, such as a random access memory (RAM), which is also connected to the bus 106. Preferably, control logic 110 represents a software program, such that the processor 104 operates in accordance with instructions in the software program.

Figure 2:
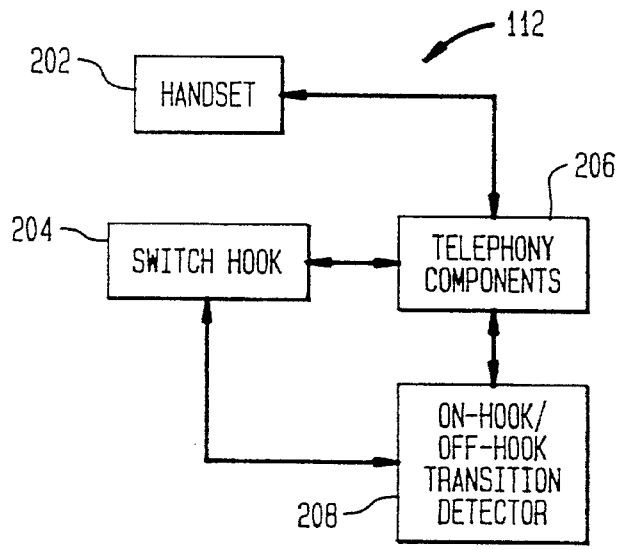
FIG. 2 is a block diagram of application specific components according to a preferred embodiment of the present invention.

The telephone 102 also includes application specific components 112, which in the preferred embodiment include telephone related components. More particularly, the application specific components 112 include telephony communication components that are necessary to enable the telephone 102 to establish and maintain communication links over a telephone line. As shown in FIG. 2, the application specific components 112 include a handset 202, a switch hook 204, an on-hook/off-hook transition detector 208, and other telephony components 206. The structure and operation of these telephony communication components will be apparent to persons skilled in the relevant art. As such, the following details pertaining to the application specific components 112 are provided for the convenience of the reader.

The handset 202 is either "off-hook" or "on-hook". Traditionally, the handset 202 is "on-hook" when it is resting on the switch hook 204. The handset 202 is "off-hook" when it is lifted from the switch hook 204. However, with modern telephones, such as "hands-free" telephones and "facsimile capability" telephones, it is more accurate to discuss the state of the electronic line switch (ELS) which controls the connection of the product to the local exchange office's end office. When the ELS is connected to the local exchange company's end office, the product is off-hook; depending upon the product's features, the handset may be physically on-hook or off-hook. When the ELS is not connected to the local exchange company's end office, the product is on-hook.

The on-hook/off-hook transition detector 208 is coupled to the switch hook 204, and detects when the handset 202 transitions from on-hook to off-hook.

Returning to FIG. 1, the telephone 102 also includes a touch screen module 114, which includes a display screen 118 and a touch screen interface 116. The display screen 118 is divided into a plurality of sectors. A unique identifier (preferably a unique digital code) is assigned to each of the sectors. The touch screen interface 116 monitors the screen 118 and detects when the screen 118 is touched. When a user touches the screen 118, the touch screen interface 116 determines which sector of the screen 118 was touched, and then sends the digital code associated with that sector to the processor 104 via the bus 106. In this manner, the processor 104 is made aware of any and all sectors of the screen 118 which are touched. Touch screen technology is well known and, thus, the structure and operation of the touch screen module 114 will be apparent to persons skilled in the relevant art.

The telephone 102 maintains a number of graphical images called "display pages" that are displayed preferably one at a time on the screen 118. These display pages are stored in the RAM 108. Alternatively, these display pages are stored in memory (not shown) contained in the touch screen module 114. For example, display pages may be stored in read only memory (ROM) (not shown), or a combination of RAM 108 and ROM, or may be generated in whole or in part by software algorithms.

Each display page includes one or more icons that resemble buttons. Accordingly, these icons are called "touch screen buttons", or simply "buttons". The buttons are arranged on the display pages such that when a display page is displayed on the screen 118, each button is positioned over a unique set of the sectors of the screen 108. That is, no two buttons (of a display page displayed on the screen 118) are positioned over the same sector of the screen 118.

Generally, each button corresponds to a feature that is provided by the telephone 102. For example, suppose a display page has a "re-dial last number" button, and a user presses this button (that is, touches that part of the screen 118 that coincides with the display of this button). The touch screen interface 116 detects the pressing of the "re-dial last number" button, and sends the digital code(s) corresponding to the screen sector(s) coincident with the "re-dial last number" button to the processor 104 via the bus 106. The processor 104, operating in accordance with the control logic 110, performs predetermined functions when it receives these digital code(s). In particular, the processor 104 instructs the application specific components 112 to re-dial the last number dialed.

Figure 3:
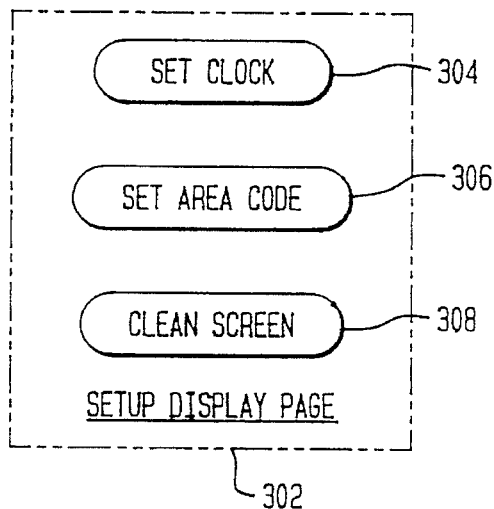
FIG. 3 depicts a "set up" display page according to a preferred embodiment of the present invention.

The telephone 102 includes a "set up" display page 302, which is shown in FIG. 3. A user navigates to this display page 302 (that is, causes the "set up" display page 302 to be displayed on the screen 118) using various navigational buttons that are contained in the display pages. These navigation buttons may include a "next menu" button, a "previous menu" button, and a "go to the set up display page" button (these buttons are not shown).

The "set up" display page 302 includes a "set clock" button 304, a "set area code" button 306, and a "clean screen" button 308. The "set up" display page 302 may also include additional buttons, such as navigational buttons.

As indicated above, the buttons 304, 306, 308 in the "set up" display page 302 correspond to features that are provided by the telephone 102. When a user presses the "set clock" button 304, the processor 104 allows the user to enter the current date and time. When a user presses the "set area code" button 306, the processor 104 allows the user to enter an area code that will be used as a default when dialing telephone numbers.

When a user presses the "clean screen" button 308, the processor 104 enables the user to clean the display screen 118 without inadvertently activating any of the features of the telephone 102 (other than the "clean screen" feature), and without removing power from the telephone 102 or from the display screen 118. Preferably, this task is automatically performed by the processor 104 operating in accordance with the control logic 110. Alternatively, the telephone 102 is made to perform this task using hardware components only, such as a hardware implemented state machine.

This "clean screen" feature makes the telephone 102 particularly advantageous. The telephone 102 uses the display screen 118 to display status information to the user. For example, this status information may include the current date and the current time, the number of recorded messages (where the telephone 102 is also an answering machine), information identifying the lines in use and the lines which are available for use, message forwarding information, system diagnostic information, incoming calls information, etc. If it was necessary to turn off the display screen 118 to clean the display screen 118, then it would not be possible to use the display screen 118 to display this status information. By providing this feature, users can clean the display screen 118 while still receiving status information, and without inadvertently activating any of the features of the telephone 102. Also, with the present invention, it is not necessary for users to remember to turn the display screen 118 back on, since it was never turned off.

The manner in which the telephone 102 enables the user to clean the display screen 118 without inadvertently activating any of the features of the telephone 102 (other than the "clean screen" feature), and without removing power from the telephone 102 or from the display screen 118, shall now be described with reference to a flowchart 402 presented in FIG. 4. This flowchart 402 is of sufficient detail to enable a person skilled in the relevant art to generate relevant portions of the control logic 110, or to generate a comparable hardware implemented state machine.

The processor 104 periodically performs the steps of flowchart 402. Alternatively, the processor 104 performs the steps of flowchart 402 on an interrupt driven basis. For example, when the user presses the "clean screen" button 308, an interrupt is generated that causes the processor 104 to perform the steps of flowchart 402 (other than steps 406 and 408).

Prior to performing the steps of flowchart 402, the processor 104 is in an active screen mode. While in the active screen mode, the processor 104 considers the display screen 118 to be active and, as such, processes all display screen sector codes sent to it from the touch screen interface 116. Such processing typically involves the invocation of features of the telephone 402, but the actual operation of the processor 104 upon receipt of the display screen sector codes is a function of the control logic 110.

The flowchart 402 begins with step 404, where control immediately passes to step 406.

In step 406, the processor 104 determines whether the user pressed the "clean screen" button 308. Preferably, the processor 104 performs step 406 by comparing each display screen sector code sent to the processor 104 from the touch screen interface 116 to the code assigned to the "clean screen" button 308. If there is a match, then the processor 104 determines that the user pressed the "clean screen" button 308.

If the processor 104 determines in step 406 that the user did not press the "clean screen" button 308, then processing of the flowchart 402 is complete, as indicated by step 408.

If, instead, it is determined in step 406 that the user pressed the "clean screen" button 308, then step 412 is performed. In step 412, the processor 104 leaves the active screen mode and enters a clean screen mode. While in the clean screen mode, the processor 104 ignores all signals sent from the touch screen module 114 to the processor 104. In other words, the processor 104 does not process any display screen sector codes sent to it from the touch screen interface 116. In this manner, the user is able to clean the display screen 118 without inadvertently invoking any of the features of the telephone 102.

The processor 104 remains in the clean screen mode until either: (1) the handset 202 goes off-hook or an on-hook to an off-hook ELS transition occurs (see step 416, described below); or (2) the user does not touch the display screen 116 for a predetermined amount of time (see step 418, described below). If either of these events occurs, then the processor 104 assumes that the user has finished cleaning the screen, and returns to the active screen mode (see step 428, described below). Thus, in the present invention, it is not necessary for the user to remember to turn the display screen 116 back on. In the present invention, the display screen 116 is never turned off, and the processor 104 switches automatically between the active screen mode and the clean screen mode.

Figure 5:
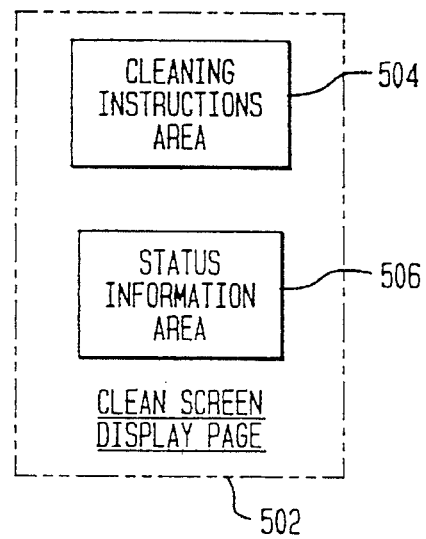
FIG. 5 depicts a "clean screen" display page according to a preferred embodiment of the present invention.

Also in step 412, the processor 104 displays a "clean screen" display page 502 (see FIG. 5) on the screen 118. The "clean screen" display page 502 has a cleaning instructions area 504 and a status information area 506. Cleaning instructions specific to the particular touch screen module 114 used (and the particular display screen 118 used) are presented in the cleaning instructions area 504. Ideally, the user follows these instructions when cleaning the display screen 118. The processor 104 displays status information in the status information area 506 (see step 424, described below). Thus, status information is provided to the user at all times, including when the user is cleaning the display screen 118.

In step 414, the processor 104 resets a counter to zero. This counter is maintained in the RAM 108, or alternatively may be maintained in a hardware register (not shown).

In step 416, the processor 104 determines whether the handset 202 is off-hook. The processor 104 preferably performs step 416 by accessing the on-hook/off-hook transition detector 208, which detects when the handset 202 has transitioned frown on-hook to off-hook. Preferably, the on-hook/off-hook transition detector 208 generates an interrupt when it detects a transition from on-hook to off-hook. This interrupt causes the processor 104 to immediately process step 428 (discussed below).

If the handset 202 is off-hook, then the processor 104 assumes that the user has finished cleaning the screen (or is no longer interested in cleaning the screen) and is in the process of answering an incoming telephone call or initiating an outgoing telephone call. Accordingly, if in step 416 it is determined that the handset 202 is off-hook, then the processor 104 in step 428 leaves the clean screen mode and returns to the active screen mode. As discussed above, while in the active screen mode, the processor 104 does not ignore signals (i.e., display screen sector codes) sent to the processor 104 from the touch screen interface 116. Instead, the processor 104 processes all display screen sector codes sent to it from the touch screen interface 116. Processing of flowchart 402 is complete after step 428, as indicated by step 430.

If in step 416 it is determined that the handset 202 is not off-hook, then step 418 is performed. In step 418, the processor 104 determines whether the counter is equal to a predetermined counter value. In essence, in step 418 the processor 104 determines whether a predetermined amount of time has passed since the user has touched the screen 118. If this predetermined amount of time has passed since the user has touched the screen 118, then the processor 104 assumes that the user is no longer cleaning the screen 118, and returns to the active screen mode (step 428).

Preferably, this predetermined amount of time is equal to 60 seconds, although this value is implementation dependent and depends on various factors, such as any alternate means for returning the screen to normal operation, the complexity of the cleaning process, the nature of the product, etc.

If in step 418 the processor 104 determines that the counter is not equal to the predetermined counter value, then step 420 is performed. In step 420, the processor 104 determines whether the screen 118 was touched since the last time that step 420 was performed (note that step 420 is part of a control logic loop). The processor 104 preferably makes this determination by determining whether the touch screen interface 116 has sent to the processor 104 any display screen sector codes since the last time that step 420 was performed. Note that the processor 104 does not process these display screen sector codes (since it is in the clean screen mode), but instead just notes if any has been sent to it. In other words, the processor 104 does not invoke any features of the telephone 102 upon receipt of these display screen sector codes.

If in step 420 it is determined that the screen 118 was not touched, then the processor 104 performs step 424 (described below). If, instead, it is determined that the screen 118 was touched, then the processor 104 assumes that the user is still cleaning the screen 118. Accordingly, the processor 104 resets the counter to zero (step 422). The processor 104 then performs step 424.

In step 424, the processor 104 displays status information in the status information area 506 of the "clean screen" display page 502. This may involve displaying new status information, and/or updating status information that is already displayed in the status information area 506. The processor 104 generates and/or obtains such status information in a well known manner.

After updating status information in step 424, the processor 426 in step 426 increments the counter. The processor 426 then returns to step 416 to continue processing while in the clean screen mode.

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A method of enabling a user to clean a display screen in a touch screen based device, comprising the steps of:
   (1) entering a "clean screen" mode in response to a request from the user to clean the display screen;
   (2) ignoring all signals generated in response to the user touching the display screen while in said "clean screen" mode, such that while in said "clean screen" mode the user is able to clean the display screen without inadvertently activating any features of the device;
   (3) determining whether the user failed to touch the display screen for a predetermined amount of time;
   (4) entering an "active screen" mode if it is determined that the user failed to touch the display screen for said predetermined amount of time; and
   (5) processing all signals generated in response to the user touching the display screen while in said "active screen" mode.

2. The method of claim 1, wherein step (4) comprises the steps of:
   incrementing a counter;
   determining whether said counter is equal to a predetermined counter value, said predetermined counter value corresponding to said predetermined amount of time;
   determining that the user failed to touch the display screen for said predetermined amount of time if said counter is equal to said predetermined counter value; and
   resetting said counter to zero upon receipt of a signal generated in response to the user touching the display screen.

3. The method of claim 1, further comprising the step of:
   displaying on the display screen status information pertaining to operation of the device while in said "clean screen" mode.

4. The method of claim 1 in which the device is a touch screen based telephone having an handset, the method also comprising the steps of:
   determining whether an on-hook to off-hook transition of the handset has occurred; and
   leaving said "clean screen" mode and entering said "active screen" mode if it is determined that an on-hook to off-hook transition has occurred.

5. A method of enabling a user to clean a display screen in a touch screen based telephone having a handset, comprising the steps of:
   (1) entering a "clean screen" mode in response to a request from the user to clean the display screen;
   (2) ignoring all signals generated in response to the user touching the display screen while in said "clean screen" mode, such that while in said "clean screen" mode the user is able to clean the display screen without inadvertently activating any features of the device;
   (3) determining whether the user has finished cleaning the display screen;
   (4) leaving said "clean screen" mode and entering an "active screen" mode if it is determined that the user has finished cleaning the display screen; and
   (5) processing all signals generated in response to the user touching the display screen while in said "active screen" mode.

6. The method of claim 5, wherein step (3) comprises the steps of:
   (a) determining whether the user failed to touch the display screen for a predetermined amount of time;
   (b) determining whether the handset is off-hook;
   (c) determining that the user has finished cleaning the display screen if it is determined that the user failed to touch the display screen for said predetermined amount of time; and
   (d) determining that the user has finished cleaning the display screen if it is determined that the handset is off-hook.

7. The method of claim 6, wherein step (a) comprises the steps of:
   incrementing a counter;
   determining whether said counter is equal to a predetermined counter value, said predetermined counter value corresponding to said predetermined amount of time;
   determining that the user failed to touch the display screen for said predetermined amount of time if said counter is equal to said predetermined counter value; and
   resetting said counter to zero upon receipt of a signal generated in response to the user touching the display screen.

8. The method of claim 5, further comprising the step of:
   displaying on the display screen status information pertaining to operation of the device while in said "clean screen" mode.

9. A touch screen based telephone, comprising:
   a touch screen based display screen;
   a processor; and
   control logic for controlling said processor to enable a user to clean said display screen, comprising:
      means for enabling said processor to enter a "clean screen" mode in response to a request from the user to clean said display screen;
      means for enabling said processor to ignore all signals generated in response to the user touching said display screen while in said "clean screen" mode, such that while in said "clean screen" mode the user is able to clean said display screen without inadvertently activating any features of said telephone;

screen touching determining means for enabling said processor to determine whether the user failed to touch said display screen for a predetermined amount of time;

means for enabling said processor to enter an "active screen" mode if it is determined that the user failed to touch said display screen for said predetermined amount of time; and means for enabling said processor to process all signals generated in response to the user touching said display screen while in said "active screen" mode.

10. The telephone of claim 9, wherein said screen touching determining means comprises:

means for enabling said processor to increment a counter;

means for enabling said processor to determine whether said counter is equal to a predetermined counter value, said predetermined counter value corresponding to said predetermined amount of time;

means for enabling said processor to determine that the user failed to touch the display screen for said predetermined amount of time if said counter is equal to said predetermined counter value; and means for enabling said processor to reset said counter to zero upon receipt of a signal generated in response to the user touching the display screen.

11. The telephone of claim 9, wherein said control logic further comprises:

means for enabling said processor to display on said display screen status information pertaining to operation of said telephone while in said "clean screen" mode.

* * * * *